(12) United States Patent
Samie et al.

(10) Patent No.: US 8,042,669 B2
(45) Date of Patent: Oct. 25, 2011

(54) ROCKER-TYPE SELECTABLE ONE-WAY CLUTCH WITH NEUTRAL POSITION

(75) Inventors: Farzad Samie, Franklin, MI (US); Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 751 days.

(21) Appl. No.: 12/109,473

(22) Filed: Apr. 25, 2008

(65) Prior Publication Data

US 2009/0266667 A1    Oct. 29, 2009

(51) Int. Cl.
*F16D 41/16*    (2006.01)
(52) U.S. Cl. .......................................... 192/43.1; 192/46
(58) Field of Classification Search ............... 192/39, 192/43.1
See application file for complete search history.

(56) References Cited

U.S. PATENT DOCUMENTS

| | | | |
|---|---|---|---|
| 348,680 A * | 9/1886 | Marlin ..................... | 192/43.1 |
| 4,995,490 A | 2/1991 | Kanai | |
| 5,927,455 A | 7/1999 | Baker et al. | |
| 5,967,277 A | 10/1999 | Walter | |
| 6,244,965 B1 * | 6/2001 | Klecker et al. ............... | 192/43.1 |
| 6,739,440 B1 | 5/2004 | Dick | |
| 6,814,201 B2 | 11/2004 | Thomas | |
| 7,100,756 B2 * | 9/2006 | Kimes et al. ..................... | 192/46 |
| 7,258,214 B2 | 8/2007 | Pawley et al. | |
| 7,344,010 B2 | 3/2008 | Fetting, Jr. et al. | |
| 7,743,678 B2 * | 6/2010 | Wittkopp et al. ............ | 192/43.1 |
| 2006/0278487 A1 | 12/2006 | Pawley et al. | |

FOREIGN PATENT DOCUMENTS

JP    11218161 A    8/1999

OTHER PUBLICATIONS

International Search Report and Written Opinion of the International Searching Authority for corresponding application PCT/US/2009/041329 filed Apr. 22, 2009.

* cited by examiner

*Primary Examiner* — Rodney Bonck
(74) *Attorney, Agent, or Firm* — Quinn Law Group, PLLC

(57) ABSTRACT

A SOWC for use with a vehicle transmission is provided. The clutch includes outer and inner elements, also referred to as races, with the latter oriented concentrically within the former about an axis of rotation. A selection mechanism, which may be annular plates operatively connected with the side of the races and with one another, is selectively rotatable with respect to the inner and outer elements between different positions. Pivotable rocker elements are positioned between the races and are movable along cammed slots of the annular plates when the annular plates are rotated to establish a forward, a reverse, and a neutral operating mode corresponding with the different positions of the annular plates. In some embodiments, in the neutral operating mode, none of the rocker elements are in contact with the inner race.

13 Claims, 6 Drawing Sheets

ROCKER-TYPE SELECTABLE ONE-WAY CLUTCH WITH NEUTRAL POSITION

TECHNICAL FIELD

The invention relates to a selectable one-way clutch.

BACKGROUND OF THE INVENTION

In a variety of mechanical devices, including the powertrains of vehicle automatic transmissions, overrunning clutches are used to produce a one-way driving connection between an input and an output race of the overrunning clutch. Specifically, the clutch is capable of transmitting torque when the rotation of one race with respect to the other is in one direction, and the clutch overruns, or freewheels, when the rotational direction of one race with respect to the other is reversed.

The shape and orientation of the input and output races with respect to each other may vary depending on design. Some one-way clutches have input and output races that are oriented radially concentric with respect to each other. In another design, the confronting faces of the input and output races are planar.

The mechanical means used to lock a one-way clutch are varied, but commonly consist of rollers, sprags, rockers, or strut types of torque transmitting elements positioned between an input and an output race. Depending on the particular type of one-way clutch and the direction of rotation, each of the races contains unique surface features that engage one or more of the torque transmitting elements.

The operating modes of a basic one-way clutch are a locked mode in one given direction, and a freewheel mode in the opposite direction. In this type of one-way clutch, the operating mode of the clutch is determined only by the direction of torque being applied to the input race.

The increased complexity of power transmitting mechanisms has led to a class of selectable one-way clutches, henceforth referred to as SOWC's. A SOWC is similar to a one-way clutch in basic operation as described above. However, as the name implies, SOWC's are capable of producing a driving connection between an input and output race in one or both rotational directions and/or are also able to freewheel in one or both rotational directions.

In a SOWC, a moveable selector ring or plate, henceforth to be called a selector plate, is commonly employed to restrict the free movement of one or more of the torque transmitting elements to achieve the various operating modes. For example, but not limited to the following, in a first position of a selector plate in a SOWC, the torque transmitting elements may have movement that is unrestricted by the selector plate, while in a second position of the selector plate, some or all of the elements may be either held in contact with the confronting face, or kept from contacting the confronting face.

SUMMARY OF THE INVENTION

A SOWC for use with a vehicle transmission is provided. The clutch includes outer and inner elements, also referred to as races, with the latter oriented concentrically within the former about an axis of rotation. At least one of the races is rotatable about the axis of rotation. The races each have first and second opposing sides. A selection mechanism, which may be annular plates operatively connected with the side of the races and with one another, is selectively rotatable with respect to the inner and outer elements between different positions. The annular plates have cammed slots spaced therearound. Pivotable rocker elements are positioned between the races and are movable along the cammed slots when the annular plates are rotated to establish a forward, a reverse, and a neutral operating mode corresponding with the different positions of the annular plates. Torque is transferred between the races in a first direction via at least one of the rocker elements in the forward operating mode. Torque is transferred between the races via at least one other of the rocker elements in an opposing second direction in the reverse operating mode. No torque is transferred between the races in the neutral operating mode. As used herein, torque is transferred from the inner race to the outer race whether the outer race is rotatable (i.e., the SOWC is a rotating-type clutch) or is stationary, such as a stationary housing (i.e., the selectable one-way clutch is a brake-type clutch).

In the neutral operating mode, the inner race is able to freewheel in both directions of rotation, and in some embodiments the cam profile of the cam slots on the annular plates is such that none of the rocker elements are in contact with the inner race in the neutral mode, eliminating rocker movement completely, and thereby increasing the durability of the SOWC and thus decreasing drag in the clutch.

Each rocker element may include a body portion with a first partial cylindrical surface and a second partial cylindrical surface, both of the cylindrical surfaces are concentric about a pivot axis and are of different radial sizes. The outer race is configured with recesses, grouped in pairs, referred to herein as pocket pairs, having partial cylindrical surfaces of the different radial sizes to maintain the rocker elements within the recesses. The inner race has notches and is configured to be selectively engaged by one or more of the rocker elements at one or more of the notches.

The design of the cam window on the selector plates enables a mode of operation where the inner race is able to freewheel in both directions. In this mode, henceforth referred to as neutral, all of the rockers are prevented from engaging the inner race. The reduction in drag afforded may reduce spin losses. Additionally, SOWCs typically have lower manufacturing costs and reduced mass in comparison with multi-plate clutches.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
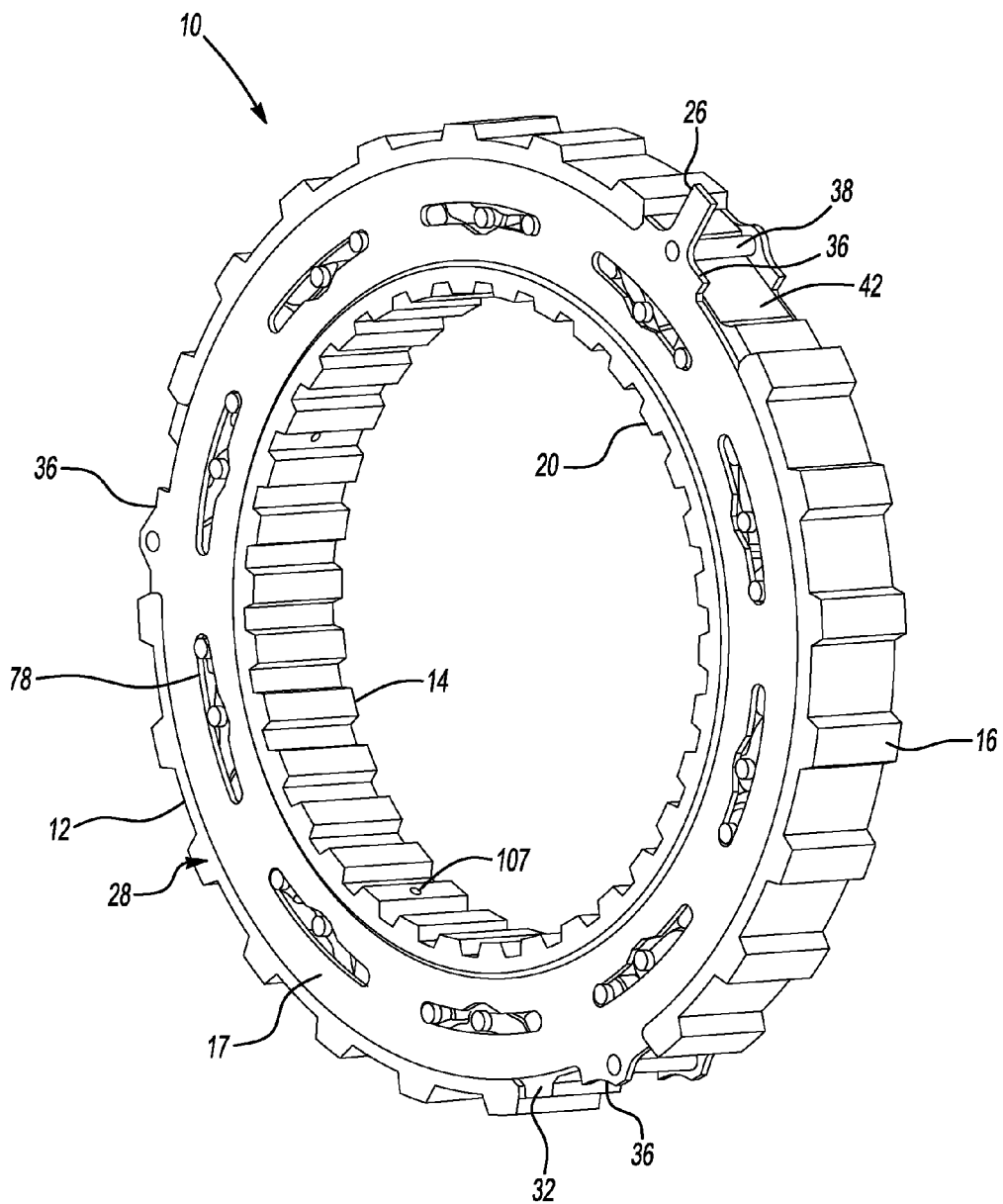
FIG. 1 is a schematic perspective illustration of a selectable one-way clutch (SOWC)
Figure 2:
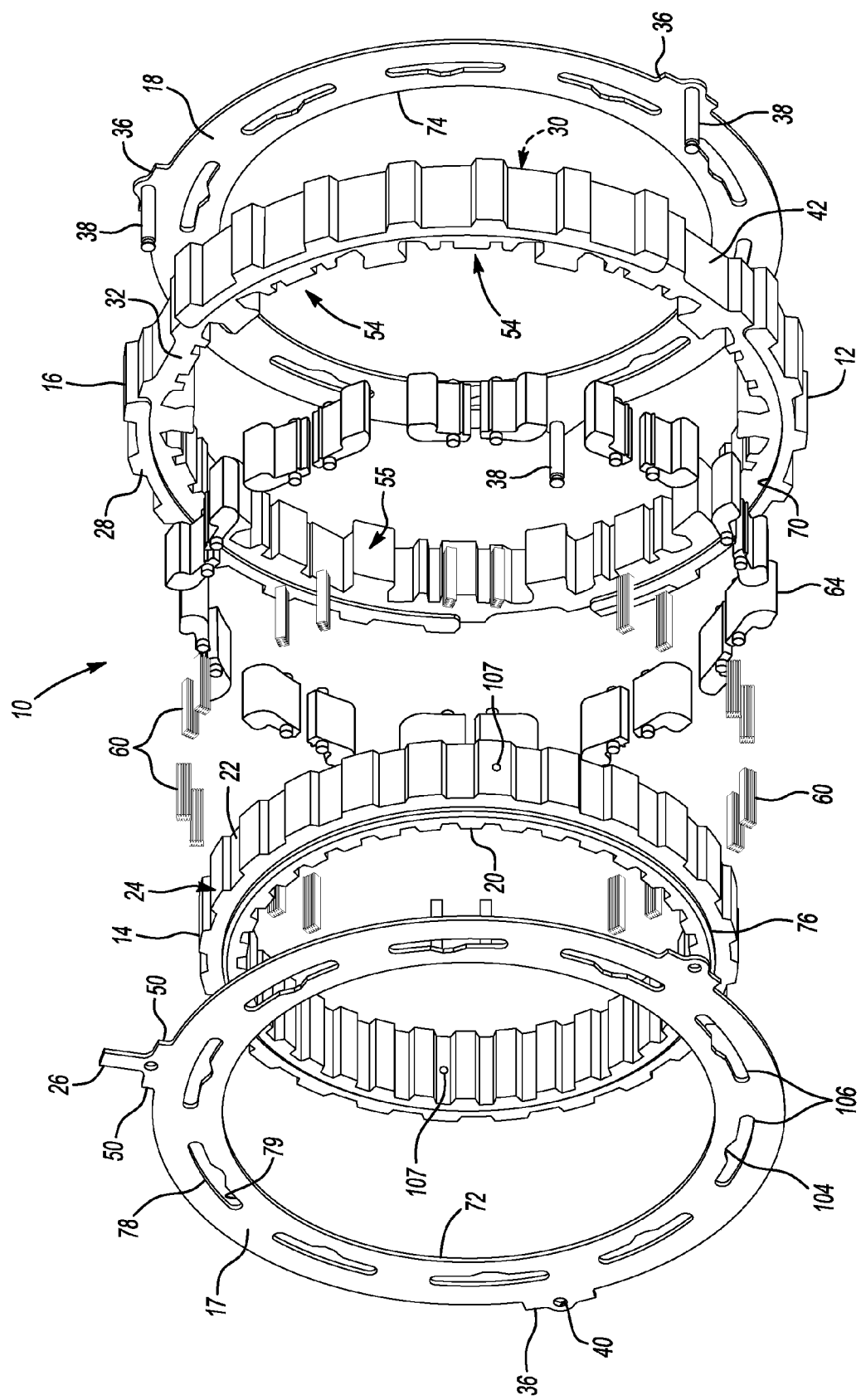
FIG. 2 is a schematic perspective illustration in exploded view of the SOWC of FIG. 1.

With reference to FIG. 1, there is shown a selectable one-way clutch or SOWC 10 having an outer race 12 and an inner race 14. For clarity, the outer and inner races, 12 and 14 respectively, are referred to hereinafter as pocket ring 12 and notch ring 14. The pocket ring 12 is preferably equipped with a plurality of external spline teeth 16 that are drivingly engageable or otherwise matable with spline teeth of a stationary reaction member, such as an automobile transmission case (not shown). A first selector plate 17 is rotatably affixed between the pocket ring 12 and the notch ring 14. A second selector plate 18, not clearly visible in FIG. 1, but similar in configuration and function to the first selector plate 17, is rotatably affixed to the far side of the SOWC 10. The notch ring 14 preferably has a plurality of equally spaced, internal teeth or splines 20 that are drivingly engageable or matable with opposing teeth or splines of a torque input device (not shown). The notch ring 14, as shown in FIG. 2, also contains a plurality of preferably equally spaced rocker recesses or notches 22 formed in a radially-outer surface of the notch ring 14, i.e., in a notch ring face 24. The first selector plate 17 contains a selector lever 26 that is moved and held in one of three positions (to be described later) by an external force (not shown) that is, but not limited to, hydraulic, mechanical, or electromechanical in nature.

Figure 4:
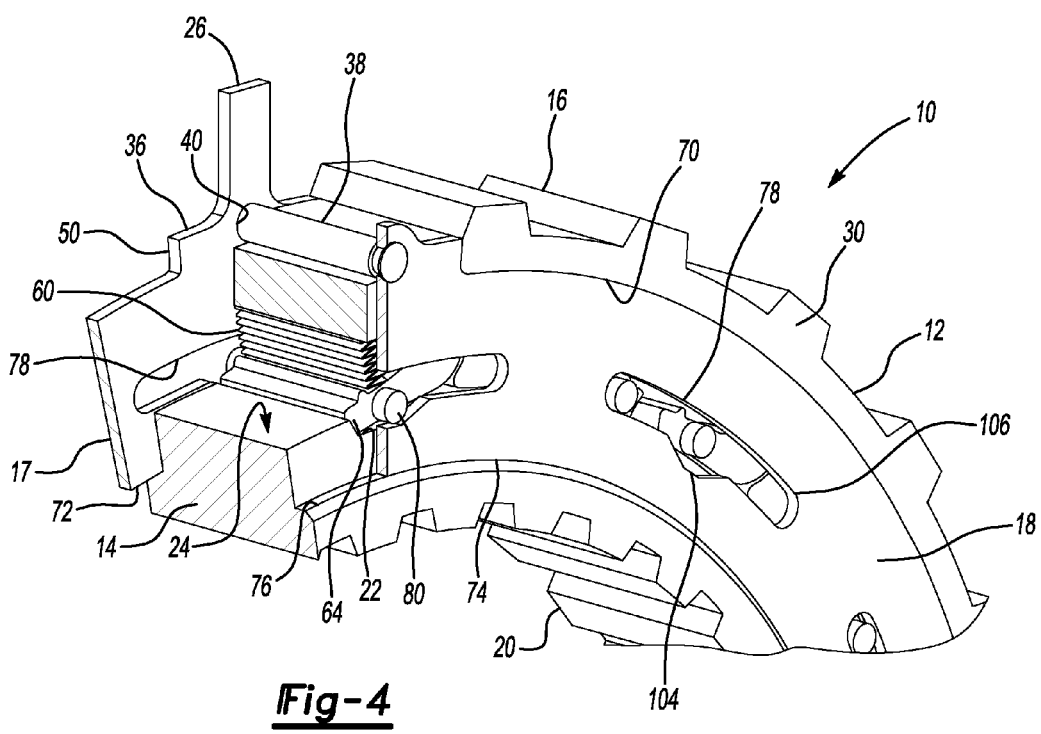
FIG. 4 is a schematic perspective partially cross-sectional and fragmentary illustration of the SOWC of FIGS. 1-2 showing the rocker element of FIG. 3 establishing a forward operating mode.

In FIG. 2, the SOWC 10 is shown in exploded view. The pocket ring 12 has a first face 28 and a second face 30 (not visible). Since all features on the second face 30 are identical to those on the first face 28, only the features on the first face 28 will be described. A plurality of radial slots 32, also referred to as positioning slots, is formed in the first face 28 of pocket ring 12 to provide an opening suitable for receiving a radial tab 36 on the first or second selector plate, 17 and 18 respectively. As best shown in FIG. 4, a stepped pin 38 extending through a hole 40 in radial tab 36 and then peened in place connects the first and second selector plates, 17 and 18, together and also retains all the parts of the SOWC 10. However, it should be evident to those familiar with the art that many different economical and common assembly methods could be used. At locations on the pocket ring 12 where the first and second selector plates, 17 and 18, are joined together, a relief or positioning slot 42 of sufficient arc length is provided to permit free angular movement of the stepped pin 38.

Figure 5:
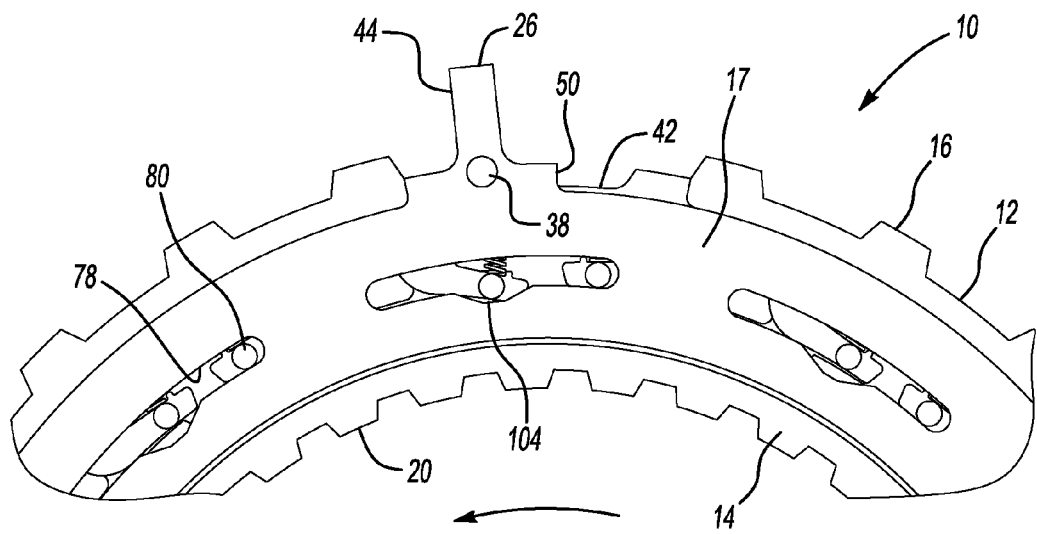
FIG. 5 is a fragmentary side view illustration of the SOWC in the forward operating mode.
Figure 7:
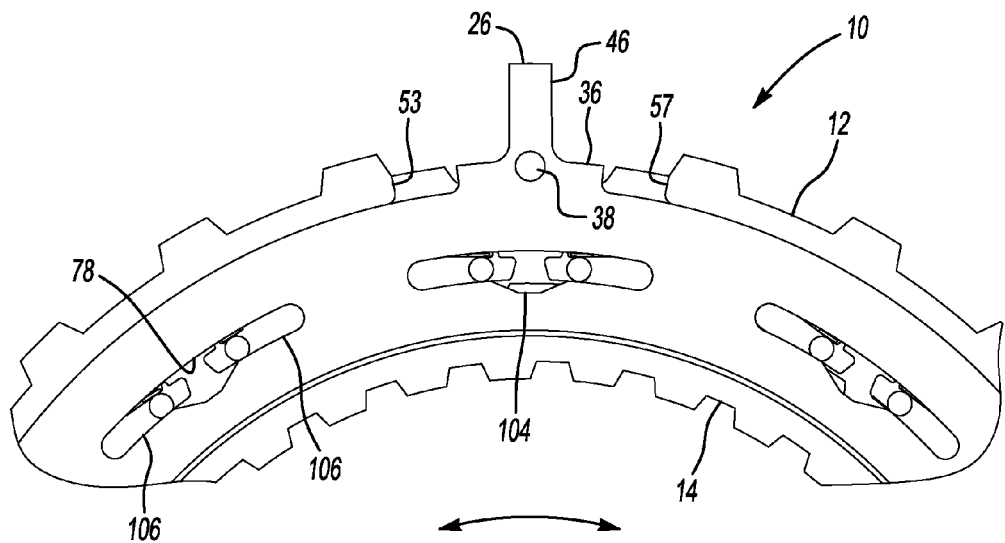
FIG. 7 is a fragmentary side view illustration of the SOWC in a neutral operating mode.
Figure 9:
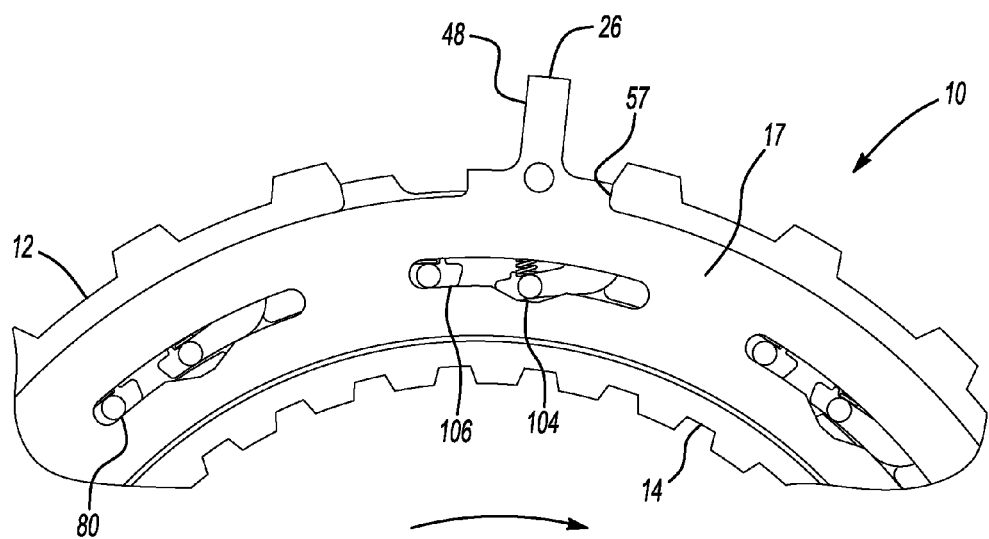
FIG. 9 is a fragmentary side view illustration of the SOWC in a reverse operating mode.

The three positions of the selector lever 26 are a forward position 44, as shown in FIG. 5, a neutral position 46, as shown in FIG. 7, and a reverse position 48, as shown in FIG. 9. The forward position 44 is defined when stop 50 located on each side of radial tab 36 comes in contact with one side 53 of the radial slot 32. In a similar fashion, the reverse position 48 is defined when the selector lever 26 is moved in the opposite direction and a stop 50 comes in contact with the other side 57 of radial slot 32. The neutral position 46 is defined as a position midway between the forward position 44 and the reverse position 48.

Referring to FIG. 2, a set of first recesses includes a plurality of equally spaced rocker pocket pairs 54 formed and positioned circumferentially around and along the internal face 55 of the pocket ring 12. Each rocker pocket pair 54 contains one forward rocker pocket 56 and one reverse rocker pocket 58 (see FIG. 6). A plurality of accordion style compression springs 60 are contained in an additional recess, also referred to as a spring pocket 62 formed with or otherwise provided adjacent to each rocker pocket, 56 and 58. The springs 60 are each configured to exert a sufficient spring force on an opposing rocker element 64 to thereby actuate or move the rocker element 64 into engagement with the notch ring 14, as described later herein below. While the accordion style compression springs 60 are preferred, an alternate energy storage device, such as a helical compression spring, or springs, (not shown), could also be employed in place of the accordion style compression spring 60. However, if helical compression springs are used, the shape of the spring pocket 62 adjacent to the rocker pocket, 56 and 58, would preferably be formed with a suitable round profile instead of a rectangular profile in order to best accommodate the shape of the compression spring. Rockers 64 that are located in forward rocker pockets 56 are henceforth referred to as forward rockers 66, and rockers 64 that are located in reverse rocker pockets 58 are henceforth referred to as reverse rockers 68.

Referring to FIG. 2, the first selector plate 17 is radially constrained in a counter bore 70 on the first face 28 of the pocket ring 12. The second selector plate 18 is radially constrained in a like manner on the second face 30 of the pocket ring 12. A first pilot bore 72 on the first selector plate 17 and a second pilot bore 74 on the second selector plate 18 engage the pilot diameters 76 on each side of notch ring 14 to maintain concentricity between the pocket ring 12 and the notch ring 14.

A plurality of preferably equally sized and spaced radial cam slots 78, each defining a cam profile 79, are formed in the first selector plate 17 in a quantity equal to the number of rocker pocket pairs 54 formed in the pocket ring 12. The size and number of cam slots 78 formed in the second selector plate 18 are similar to those in the first selector plate 17. Each cam slot 78 is configured to allow axial extensions, also referred to as cam pins 80, protruding from each side of rocker element 64 to engage a cam slot 78 on the first and second selector plates 17 and 18, respectively. The cam slot 78 is shaped and positioned so the cam pins 80 from one forward rocker 66 located in a forward rocker pocket 56 and from one reverse rocker 68 located in a reverse rocker pocket 58 engage the same cam slot 78.

Figure 6:
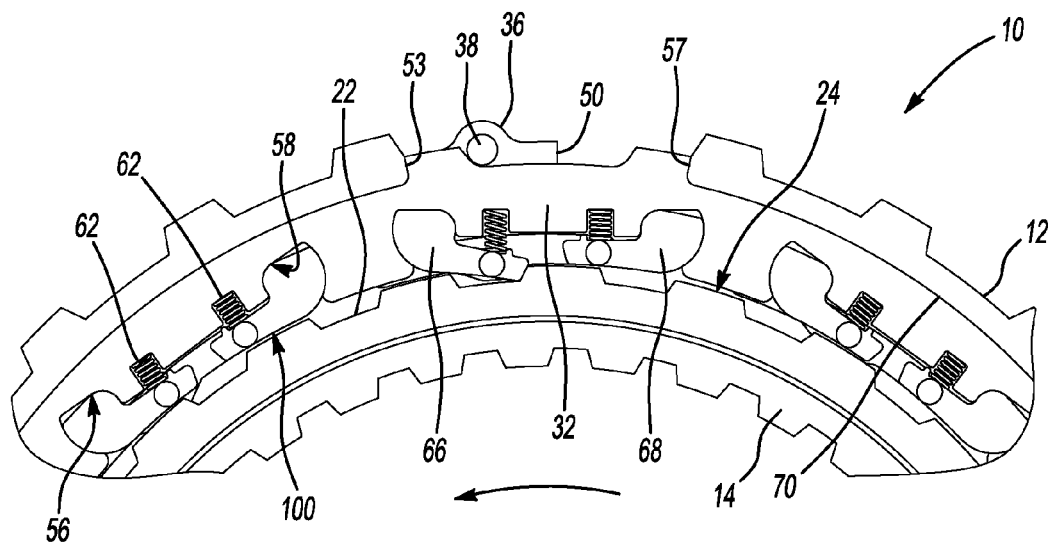
FIG. 6 is a fragmentary side view illustration of the SOWC in the forward operating mode with a front selector plate removed.
Figure 10:
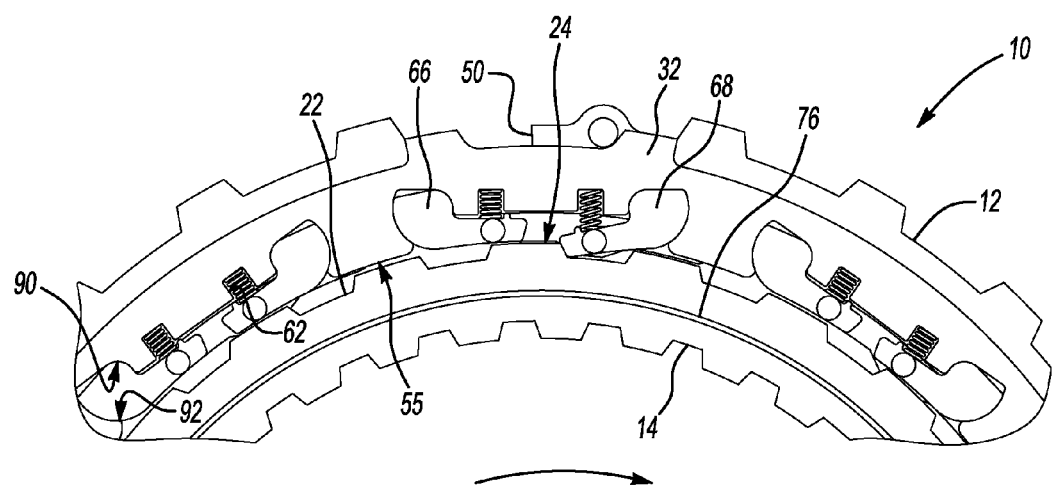
FIG. 10 is a fragmentary side view illustration of the SOWC in the reverse operating mode with front selector plate removed.

Each cam slot 78 is configured to allow only the forward rockers 66 located in the forward rocker pockets 56 to contact the notch ring face 24 when the selector lever 26 is in the forward position 44, as shown in FIGS. 5 and 6. Similarly, as shown in FIGS. 9 and 10, each cam slot 78 is configured to allow only the reverse rockers 68 located in the reverse rocker pockets 58 to contact the notch ring face 24 when the selector lever 26 is in the reverse position 48. In the neutral position 46, none of the rockers 64 are free to contact the notch ring face 24. This can best be seen in FIGS. 7 and 8.

Turning again to FIG. 4, the SOWC 10 is shown in perspective cross-sectional view, with cross-sections taken at various locations to best view the interfitting of the rocker element 64 in notch 22, within cam slots 78 and biased by spring 60 such that pocket ring 12 is in mating engagement with notch ring 14. Each rocker pocket 56 and 58, in pocket ring 12 contains a rocker element 64 that is free to rock about its own axis 82 (see FIG. 3) within the rocker pocket, 56 and 58. In the SOWC 10 as shown, two diametrically opposite rocker elements 64 simultaneously engage diametrically opposite rocker notches 22 in the notch ring 14 thereby canceling out the reaction forces generated by the engagement of rocker element 64 with the notch 22. However, the number of rocker elements 64 that are simultaneously engaged with an adjacent rocker notch 68 can be more or less, and depends on the ratio of rocker pocket pairs 54 in the pocket ring 12 to the number of notches 22 on the notch ring 14.

Figure 3:
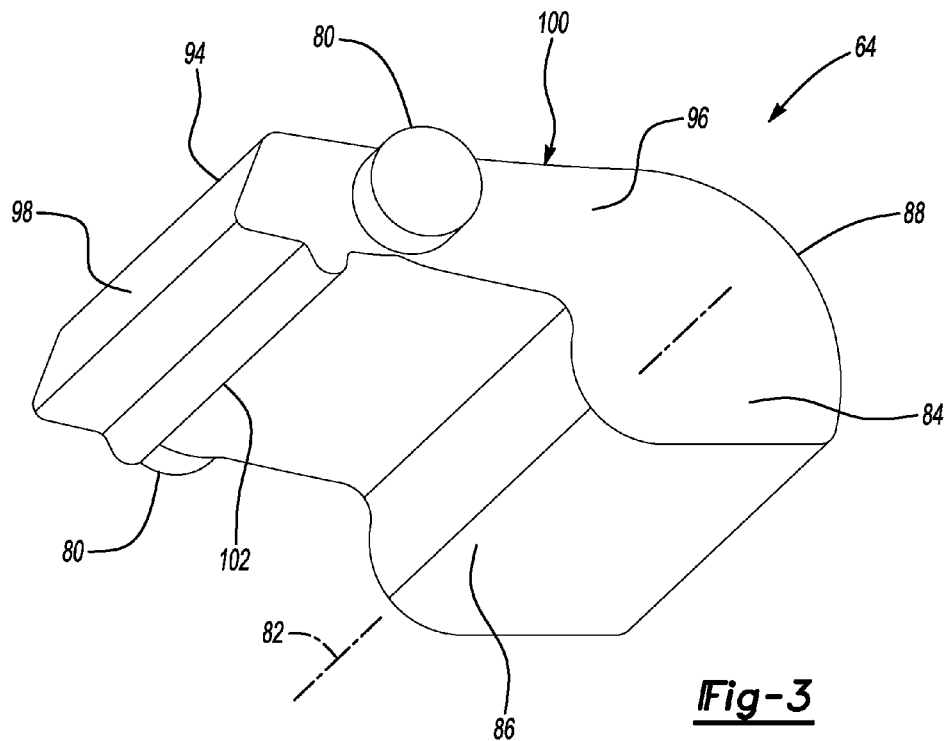
FIG. 3 is a schematic perspective illustration of a rocker element include in the SOWC of FIGS. 1 and 2.

Turning now to FIG. 3, which shows the rocker element 64 in detail, the rocker element 64 includes a cylindrical body 84 formed by a smaller partially cylindrical surface 86 and a larger partially cylindrical surface 88 concentrically located about a rocker axis 82. Correspondingly, the forward and reverse rocker pockets 56 and 58, respectively, each contain a similar small cylindrical surface 90 and a larger cylindrical surface 92 concentrically positioned. The arc length of the cylindrical surfaces 90 and 92 in the pocket ring 12 are sufficiently longer than the arc lengths 86 and 88 on the rocker element 64 such that the rocker elements 64 can not move radially out of the respective rocker pockets 56 and 58. The rocker elements 64 are installed in the respective rocker pockets 56 and 58 by sliding into position from either side of the pocket ring 12. Attached to and extending from the cylindrical body 84 of the rocker element 64 is a plate or finger 94 with the base 96 preferably being thicker or wider than the free end 98, thereby reducing bending stresses on the rocker element 64. The inward facing surface 100 of the finger 94 that contacts the notch ring 14 is slightly convex such that the center of radius of the inward facing surface 100 is coincident with the axis of rotation of the SOWC 10 when the rocker element 64 is disengaged from the notch ring 14, i.e., when the selector lever 26 is in the neutral position 46 (best seen in FIG. 8). A spring retaining rib 102 on the finger 94 of rocker element 64 restricts movement of the end of the accordion style compression spring 60 that is in contact with the rocker element 64. However, if helical compression springs are used, the shape of the spring retaining rib 102 would preferably be of a suitable round profile, such as a counter-bored recess or protruding pin, to best accommodate the shape of a round spring.

Turning now to FIGS. 5 and 6, the "forward locked" position is shown with notch ring 14 rotating in a counterclockwise direction as indicated by the arrow. This direction is henceforth referred to as the forward direction. A forward rocker 66 is shown fully engaged in a rocker notch 22 on the notch ring 14. As the selector lever 26 is slidably rotated to the forward position 44, the cam pins 80 on all of the forward rockers 66 in the forward rocker pockets 56 will be positioned over the substantially V-shaped recess portion 104 in the middle of each cam slot 78. In this position, the forward rockers 66 are urged into contact with the notch ring face 24 by the accordion style compression springs 60 with at least one forward rocker 66 fully engaging a rocker notch 22 on the notch ring 14 thereby enabling a force to be transmitted between the pocket ring 12 and the notch ring 14. With the selector lever 26 in the forward position 44, and the direction of rotation of the notch ring 14 changed to a clockwise direction, henceforth referred to as the reverse direction, the forward rockers 66 are free to move away from engagement with the rocker notches 22 by pivoting about the rocker axis 82. In this manner, the notch ring 14 is free to rotate in the reverse direction.

Figure 8:
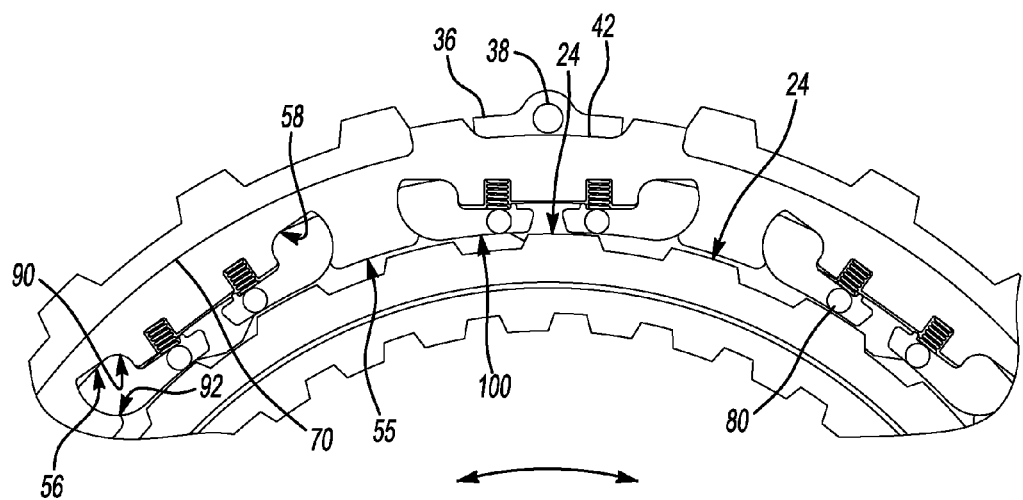
FIG. 8 is a fragmentary side view illustration of the SOWC in the neutral operating mode with the front selector plate removed.

Turning now to FIGS. 7 and 8, a neutral position is shown, with notch ring 14 free to rotate in both directions as indicated by the double ended arrow. When the selector lever 26 is rotated to the neutral position 46, the cam pins 80 on all the rocker elements 64 are positioned in the slotted ends 106 of the cam slots 78. In this position, all of the forward rockers 66 and all of the reverse rockers 68 are prevented from coming in contact with the notch ring face 24.

In FIGS. 9 and 10, the "reverse locked" position is shown with notch ring 14 rotating in a clockwise, or reverse, direction as indicated by the arrow. A reverse rocker 68 is shown fully engaged in a rocker notch 22 on the notch ring 14. As the selector lever 26 is slidably rotated to the reverse position 48, the cam pins 80 on all of the reverse rockers 68 in the reverse rocker pockets 58 will be positioned over the V-shaped recess portion 104 in the middle of each cam slot 78. In this position, the reverse rockers 68 are urged into contact with the notch ring face 24 by the accordion style compression springs 60 with at least one reverse rocker 68 fully engaging a rocker notch 68 on the notch ring 14, thereby enabling a force to be transmitted between the pocket ring 12 and the notch ring 14. With the selector lever 26 still in the reverse position 48 and the direction of rotation of the notch ring 14 changed to the forward direction, the reverse rockers 68 are free to move away from engagement with the rocker notches 22 by pivoting about the rocker axis 82. In this manner, the notch ring 14 is free to rotate in the forward direction.

The force transmitted between the pocket ring 12 and the notch ring 14 via a rocker element 64 contains both a radial and a tangential component. To minimize bearing loading, maintain concentricity between mating parts, and increase the torque capacity of the SOWC 10, more than one equally spaced rocker element 64 may be engaged with a like number of rocker notches 22. However, torque will be transmitted between the pocket ring 12 and the notch ring 14 even if only a single rocker element 64 engages a notch 22 on the notch ring face 24 of the notch ring 14.

A series of radial oil passages 107 (see FIGS. 1 and 2) in the notch ring 14 provide damping and lubrication to the rocker elements 64 as they move in and out of the rocker notches 22 in the notch ring face 24 during the freewheeling modes. The radial oil passages 107 also provide lube oil and cooling to part surfaces moving relative to each other during the freewheeling modes.

While the best modes for carrying out the invention have been described in detail, those familiar with the art to which this invention relates will recognize various alternative designs and embodiments for practicing the invention within the scope of the appended claims.

The invention claimed is:

1. A selectable one-way clutch comprising:
concentric inner and outer races each having first and second opposing sides;
annular plates operatively connected with the sides of the races and with one another; wherein the annular plates have cammed slots spaced therearound and are selectively rotatable with respect to the inner and outer races to different positions;
pivotable rocker elements positioned between the races and movable along the cammed slots when the annular plates are rotated to establish a forward, a reverse, and a neutral operating mode corresponding with the different positions of the annular plates; wherein torque is transferred between the races in a first direction via at least one of the rocker elements in the forward operating mode; wherein torque is transferred between the races via at least one other of the rocker elements in an opposing second direction in the reverse operating mode; and wherein no torque is transferred between the races in the neutral operating mode.

2. The selectable one-way clutch of claim 1, wherein the rocker elements are configured such that:
when the annular plates are in a first of the different positions, said at least one of the rocker elements interferes with the inner and outer races so that torque is transmitted from the inner race to the outer race when the inner race rotates in a first direction of rotation, and the inner race overruns when the inner race rotates in a second direction of rotation;

when the annular plates are in a second of the different positions, said at least one other of the rocker elements interferes with the inner and outer races so that torque is transmitted from the inner race to the outer race when the inner race rotates in the second direction of rotation, and the inner race overruns when the inner race rotates in the first direction of rotation; and when the annular plates are in a third of the different positions, the inner race overruns both when the inner race rotates in the first direction of rotation and when the inner race rotates in the second direction of rotation.

3. The selectable one-way clutch of claim 1, wherein the rocker elements do not contact the inner race in the neutral operating mode.

4. The selectable one-way clutch of claim 1, wherein one of the annular plates has a tab extending radially therefrom; wherein the outer race has a positioning slot with first and second ends and extending partially along an outer circumferential surface thereof; wherein the first and second positions of the annular plates are defined by interference of the tab with the outer race when the tab is at the first and second ends of the positioning slot, respectively.

5. The selectable one-way clutch of claim 4, further comprising:
a pin extending through the tab and operatively connecting the annular plates;
wherein the pin moves with the annular plates when the annular plates are shifted between the first, second, and third positions.

6. The selectable one-way clutch of claim 5, wherein the rocker elements each have an elongated finger portion extending from the body portion; wherein the inner race has recesses spaced therearound; and at least one of the finger portions extends into one of the recesses of the inner race when the annular plates are in the first position to permit torque transfer between the races; and wherein at least one other of the finger portions extends into one of the recesses of the inner race when the annular plates are in the second position to permit torque transfer between the races.

7. The selectable one-way clutch of claim 1, wherein each rocker element pivots about a respective rocker pivot axis; wherein each rocker element has a body portion with a first partial cylindrical surface and an opposing second partial cylindrical surface; wherein the first and second partial cylindrical surfaces are concentric about the rocker pivot axis and are of different radial sizes; and
wherein the outer race is configured with recesses having partial cylindrical surfaces of the different radial sizes to maintain the rocker elements within the recesses.

8. The selectable one-way clutch of claim 7, wherein the recesses are first recesses and wherein the outer race includes additional recesses; and further comprising:
springs within the additional recesses between the outer race and the rocker elements biasing the rocker elements into the first recesses of the outer race.

9. The selectable one-way clutch of claim 8, wherein each respective rocker element includes a respective rib protruding therefrom to retain a respective one of the springs against the rocker element as the rocker element pivots.

10. The selectable one-way clutch of claim 1, wherein each rocker element pivots about a respective rocker pivot axis; wherein each rocker element includes axial extensions offset from the rocker pivot axis and biased against a cam profile of the cammed slot by the springs.

11. A selectable one-way clutch comprising:
inner and outer elements concentric about an axis of rotation, at least one of the elements being rotatable about the axis of rotation;
pivotable rocker elements positioned between the inner and outer elements;
a selection mechanism generally surrounding the rocker elements and selectively rotatable with respect to the inner and outer elements between a first position, a second position and a third position to pivot the rocker elements so that the rocker elements permit one-way torque transfer between the inner and outer elements in respective opposing directions both when the selection mechanism is in the first position and when the selection mechanism is in the second position; and to prevent torque transfer between the inner and outer elements when the selection mechanism is in the third position; wherein the rocker elements do not contact the inner element when the annular plates are in the third position;
wherein the selection mechanism has connected plates surrounding the inner and outer elements axially, wherein each of the plates has cammed slots therein; and wherein the pivotable rocker elements pivot along the respective cammed slots when the selection mechanism is selectively rotated between the different positions.

12. A selectable one-way clutch comprising:
an inner and an outer race ; wherein the outer race is concentric with the inner race, each of the races having first and second opposing sides; wherein the outer race surrounds the inner race radially outward thereof;
annular plates operatively connected with the sides of the races and with one another; wherein the annular plates have cammed slots spaced therearound and are selectively rotatable with respect to the inner and outer races to different positions;
pivotable rocker elements mechanically controlled by the cammed slots of the annular plates to establish different operating modes of the races corresponding with the different positions of the annular plates; and
wherein the pivotable rocker elements are configured to establish three operating modes corresponding with first, second and third positions of the plates, including a forward mode and a reverse mode in which torque is transferred between the races in respective opposite directions of rotation, and a neutral mode in which the cammed slots prevent the rocker elements from contacting the inner race.

13. The selectable one-way clutch of claim 12, wherein the inner race has a radially-outer surface with a first set of recesses spaced therearound;
wherein the outer race has a radially-inner surface facing the radially-outer surface and with a second set of recesses spaced therearound;
wherein at least one of the rocker elements interferes with the inner race in one of the recesses of the first set of recesses in the forward mode such that torque is transmitted by the selectable one-way clutch; and wherein at least one other rocker element is configured to interfere with the inner race in one of the recesses of the first set of recesses in the reverse mode such that torque is transmitted by the selectable one-way clutch.

* * * * *